(12) United States Patent
Huang et al.

(10) Patent No.: US 8,990,680 B2
(45) Date of Patent: Mar. 24, 2015

(54) METHODS AND SYSTEMS FOR MANAGING FAULT-TOLERANT WEBPAGE PRESENTATION

(75) Inventors: Ta-Chien Huang, Taipei (TW); Ping-Hung Chou, Taipei (TW)

(73) Assignee: Via Technologies Inc., Hsin-Tien, Taipei (TW)

( * ) Notice: Subject to any disclaimer, the term of this patent is extended or adjusted under 35 U.S.C. 154(b) by 2033 days.

(21) Appl. No.: 11/388,281

(22) Filed: Mar. 24, 2006

(65) Prior Publication Data

US 2007/0162543 A1 Jul. 12, 2007

(30) Foreign Application Priority Data

Dec. 28, 2005 (TW) ................................ 94146973 A

(51) Int. Cl.
  *G06F 17/00* (2006.01)
  *G06F 17/30* (2006.01)

(52) U.S. Cl.
  CPC ...... *G06F 17/30905* (2013.01); *G09G 2320/06* (2013.01); *G06F 17/30899* (2013.01); *G09G 2320/0666* (2013.01)
  USPC ..................... 715/238; 715/234; 707/E17.119

(58) Field of Classification Search
  CPC .................. G06F 17/30905; G06F 17/30899; G09G 2320/06; G09G 2320/0666
  USPC ............... 715/273–277, 234–232, 238, 229; 707/E17.121
  See application file for complete search history.

(56) References Cited

U.S. PATENT DOCUMENTS

| | | | |
|---|---|---|---|
| 6,025,823 A * | 2/2000 | Choi ............................ | 345/101 |
| 6,167,441 A | 12/2000 | Himmel | |
| 6,182,212 B1 * | 1/2001 | Atkins et al. ...................... | 713/1 |
| 6,300,947 B1 | 10/2001 | Kanevsky | |
| 6,370,141 B1 * | 4/2002 | Giordano et al. ............. | 370/386 |
| 6,610,105 B1 | 8/2003 | Martin, Jr. et al. | |
| 6,822,663 B2 * | 11/2004 | Wang et al. .................... | 715/854 |

(Continued)

FOREIGN PATENT DOCUMENTS

AU   200183624   *   2/2003

OTHER PUBLICATIONS

Composite Capability/Preference Profiles (CC/PP): Structure and Vocabularies 1.0 W3C Recommendation Jan. 15, 2004; http://www.w3.org/TR/CCPP-struct-vocab/; W3C CCPP Structure and Vocab 2004.pdf.*

(Continued)

*Primary Examiner* — Kavita Padmanabhan
*Assistant Examiner* — Benjamin J Smith
(74) *Attorney, Agent, or Firm* — McClure, Qualey & Rodack, LLP

(57) ABSTRACT

A method for managing fault-tolerant webpage presentation. First, platform configurations for presenting a first webpage of a web server are stored. When a request for downloading the first webpage is received from a client computer, the webpage presentation capabilities thereof is subsequently detected and compared with the platform configurations. When the capabilities satisfy the platform configurations, the first webpage is transmitted to the client computer. When any incompatibility exists between the capabilities and the platform configurations, a second webpage is generated from a data search based on the difference between the capabilities and the platform configurations, and then transmitted to the client computer.

5 Claims, 4 Drawing Sheets

(56) References Cited

U.S. PATENT DOCUMENTS

| | | | |
|---|---|---|---|
| 7,262,778 B1* | 8/2007 | Edwards et al. | 345/589 |
| 7,356,575 B1* | 4/2008 | Shapiro | 709/220 |
| 7,408,557 B2* | 8/2008 | Ko et al. | 345/590 |
| 7,428,725 B2* | 9/2008 | Niyogi et al. | 717/109 |
| 7,502,838 B2* | 3/2009 | Franco et al. | 709/219 |
| 7,511,682 B2* | 3/2009 | Fuller et al. | 345/1.1 |
| 7,620,891 B2* | 11/2009 | Aubert et al. | 715/236 |
| 7,627,648 B1* | 12/2009 | Mehta et al. | 709/217 |
| 7,783,613 B2* | 8/2010 | Gupta et al. | 707/693 |
| 2002/0035579 A1* | 3/2002 | Wang et al. | 707/513 |
| 2002/0099829 A1* | 7/2002 | Richards et al. | 709/227 |
| 2003/0110234 A1* | 6/2003 | Egli et al. | 709/217 |
| 2004/0017393 A1* | 1/2004 | Easwar | 345/744 |
| 2004/0117735 A1* | 6/2004 | Breen | 715/517 |
| 2004/0215757 A1* | 10/2004 | Butler | 709/223 |
| 2005/0076253 A1* | 4/2005 | Lu | 713/320 |
| 2005/0198377 A1* | 9/2005 | Ferguson et al. | 709/238 |
| 2005/0203844 A1* | 9/2005 | Ferguson et al. | 705/40 |
| 2005/0216824 A1* | 9/2005 | Ferguson et al. | 715/501.1 |
| 2005/0243019 A1* | 11/2005 | Fuller et al. | 345/1.3 |
| 2006/0184638 A1* | 8/2006 | Chua et al. | 709/217 |
| 2006/0184639 A1* | 8/2006 | Chua et al. | 709/217 |
| 2007/0036152 A1* | 2/2007 | Giordano et al. | 370/352 |
| 2007/0083810 A1* | 4/2007 | Scott et al. | 715/525 |
| 2007/0098355 A1* | 5/2007 | Kim | 386/46 |
| 2008/0256436 A1* | 10/2008 | Atkin et al. | 715/234 |
| 2010/0039414 A1* | 2/2010 | Bell | 345/207 |

OTHER PUBLICATIONS

Dynadev; "Javascript: Checking a user's screen resolution & changing browser settings"; http://www.dynasight.net/dynasight-arcplan-english/tips-tricks/524-javascript-checking-a-user-s-screen-resolution-changing-browser-settings/; Aug. 24, 2004; 3 pages.*

Kingkelly; "JavaScript and AJAX Forum Change Resolution Need a javascript?"; http://www.webmasterworld.com/forum91/280.htm; Feb. 6, 2003; 2 pages.*

Ga_ga; "JavaScript and AJAX Forum Using Javascript in IE6 to change screen resolution is it possible?"; http://www.webmasterworld.com/forum91/1313.htm; Feb. 21, 2004; 2 pages.*

Sreejith ss nair; "Dynamic Screen Resolution"; http://www.codeproject.com/Articles/6810/Dynamic-Screen-Resolution?msg=881562#xx881562xx; Apr. 21, 2004; 5 pages.*

Faheem Iqbal; "Automatic style changes of ASP.NET controls as per client's screen resolution"; http://www.codeproject.com/Articles/13776/Automatic-style-changes-of-ASP-NET-controls-as-per; Apr. 13, 2006; 7 pages.*

Paul Kuliniewicz; "Windows API Guide: ChangeDisplaySettings Function"; http://vbonline.8m.com/oldapi/ref/c/changedisplaysettings.html; Jan. 21, 2001; 3 pages.*

Edward Falzon; "Changing Screen Resolution Automatically"; http://www.novell.com/coolsolutions/tip/2947.html; Aug. 9, 2000; 2 pages.*

* cited by examiner

METHODS AND SYSTEMS FOR MANAGING FAULT-TOLERANT WEBPAGE PRESENTATION

BACKGROUND OF THE INVENTION

1. Field of the Invention

The present invention relates to computer network techniques, and particularly to methods and systems for managing fault-tolerant webpage presentation.

2. Description of the Related Art

As rapid and diversified development of the Internet has led to web browser incompatibility. Although different browsers conform to standards created by the World Wide Web Consortium (W3C), new techniques are continuously and respectively introduced. Web designers may choose a specification (such as the specification for Microsoft Internet Explorer) of only one web browser manufacturer when designing a web site. When a webpage of the web site is opened by a web browser of another type (such as Netscape Communicator), exceptions may occur. For example, the webpage cannot be opened, the layout of the webpage is disordered, the color is distorted, or animations disappear.

There may be various causes underlying the exceptions. Without technical knowledge, general users may not have enough information to handle a situation in which a webpage fails to open.

BRIEF SUMMARY OF THE INVENTION

An exemplary embodiment of a method for managing fault-tolerant webpage presentation is provided. Configuration of a platform for displaying a first webpage of a web server is stored in advance. When receiving a request from a client computer for downloading the first webpage, the webpage presentation capability of the client computer is detected and compared with the configuration of the platform. When the webpage presentation capability and the configuration of the platform have a difference therebetween, a search is performed based on the difference to provide a second webpage. The second webpage is then transmitted to the client computer.

An exemplary embodiment of a system for managing fault-tolerant webpage presentation comprises a database, a detector, and a troubleshooter. The database stores configuration of a platform for displaying a first webpage of a web server. When receiving a request from a client computer for downloading the first webpage, the detector detects webpage presentation capability of the client computer. The troubleshooter compares the webpage presentation capability with the configuration of the platform. When the webpage presentation capability conforms to the configuration of the platform, the first webpage is transmitted to the client computer, and, when the webpage presentation capability and the configuration of the platform have a difference therebetween, a search is performed based on the difference to provide a second webpage, and the second webpage is transmitted to the client computer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
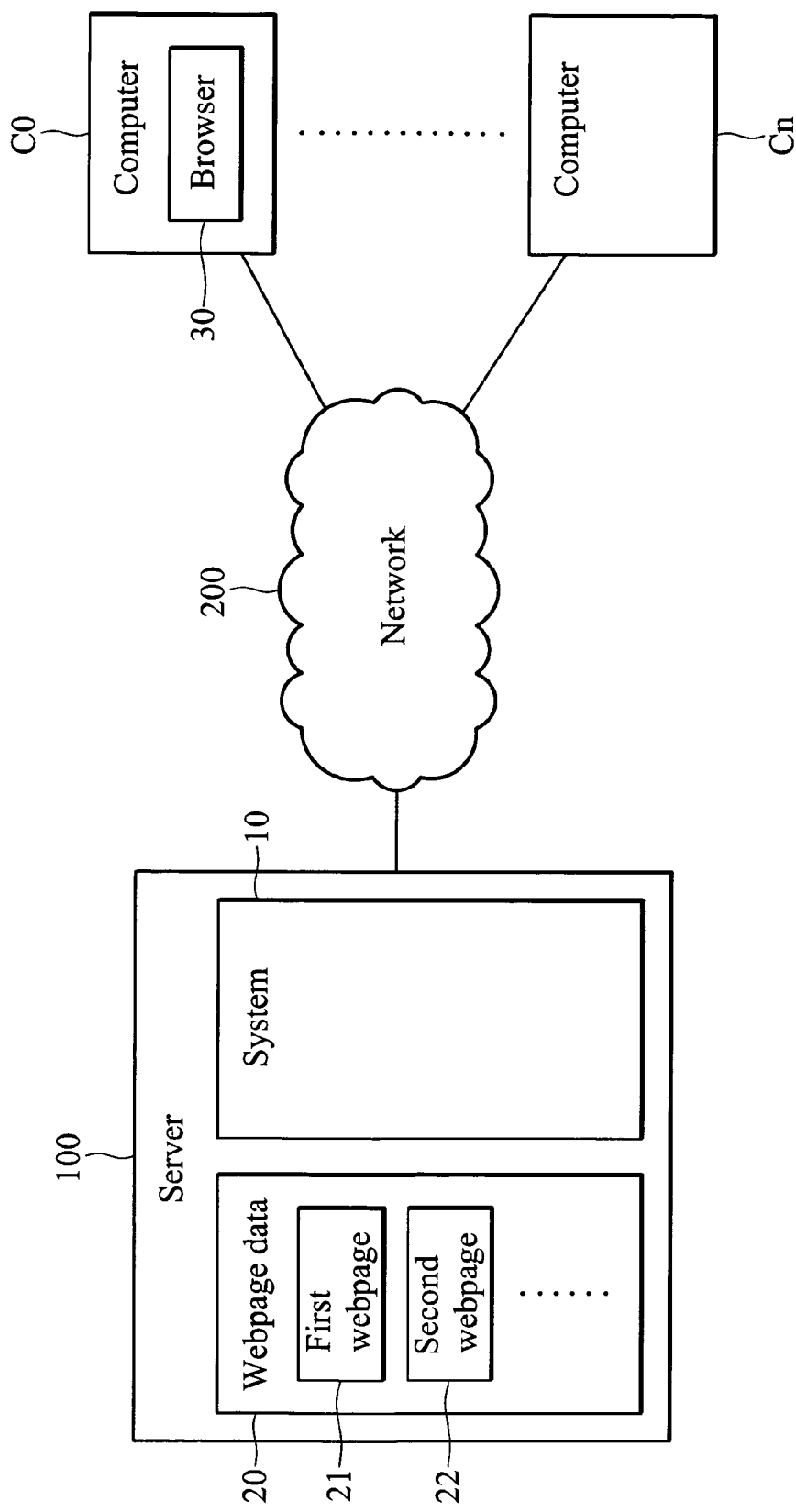
FIG. 1 is a schematic view of the configuration of a network.

A method for managing fault-tolerant webpage presentation may be implemented in a network in FIG. 1. Network 200 is connected to a server 100, computers C0-Cn, wherein n is a positive integer. Computers C0-Cn are capable of network communication, webpage download and display. The server 100 is a web server including a system 10 for managing fault-tolerant webpage presentation and webpage data 20 including First webpage 21, Second webpage 22, and so on, such as static webpages or dynamic webpage resources. Computer C0 includes a Browser 30 for requesting download of Webpage data 20 (such as First webpage 21) form Server 100. Network 200 may be a local area network (LAN) or the Internet. Computers C0-Cn may be personal computers, notebooks, terminals, mobile phones, personal digital assistants (PDAs), or other computing devices. Web browser 30 of computer C0 requests download of first webpage 21 from server 100. For example, first webpage 21 may be, but is not limited to a homepage of a webpage site.

Figure 2:
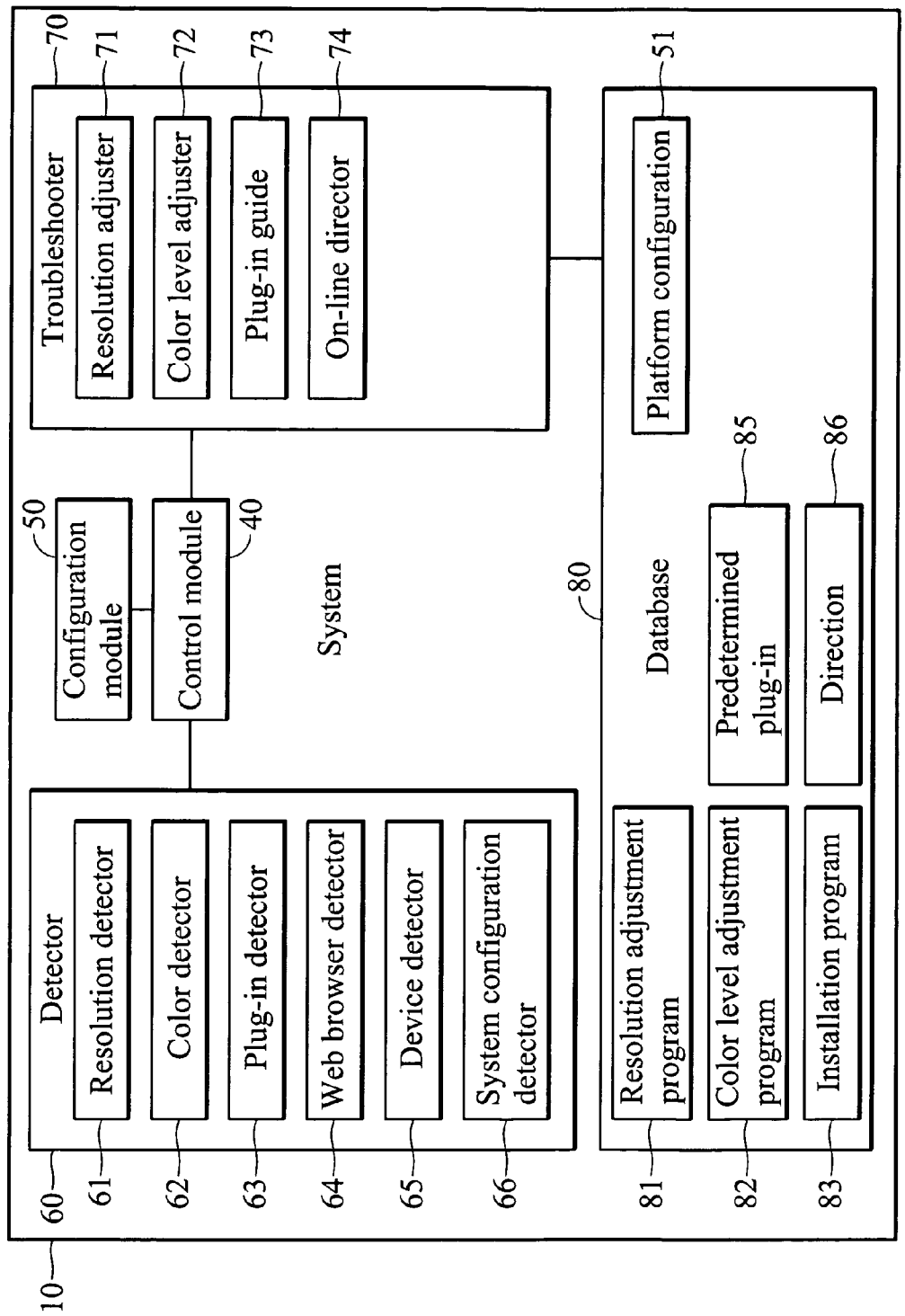
FIG. 2 is a block diagram of an exemplary embodiment of a system for managing fault-tolerant webpage presentation.

Referring to FIG. 2, the system 10 may be implemented by computer programs to be executed in server 100 while modules of the system 10 may be respectively executed by different servers. Configuration module 50 is utilized to set platform configuration for the web data (such as First webpage 21), such as intended computer types for displaying the webpage data, resolution and color level of a display, and types, versions, plug-ins, and cookies of web browsers. The system 10 may be installed in different servers, and platform configuration of webpages stored on these servers can be set via an interface provided by configuration module 50.

Detector 60 detects webpage presentation capability of client computers requesting webpages. Troubleshooter 70 provides and transmits solutions and related resources to client computers according to data detected by detector 60 and platform configuration provided by configuration module 50. Solution database 80 stores related information of platform configuration 51, such as download addresses of resources indicated by platform configuration 51. Solution Database 80 may also comprise webpage data 20. Control module 40 coordinates cooperation of the modules of system 10.

Figure 3:
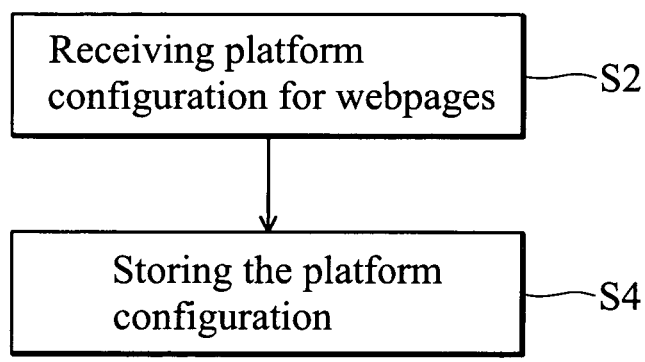
FIG. 3 is a flowchart showing platform configuration.

With reference to FIG. 3, configuration module 50 receives platform configuration 51 for webpage data 20 from input devices (not shown) of server 100 (steps S2) and stores platform configuration 51 (steps S4).

Figure 4:
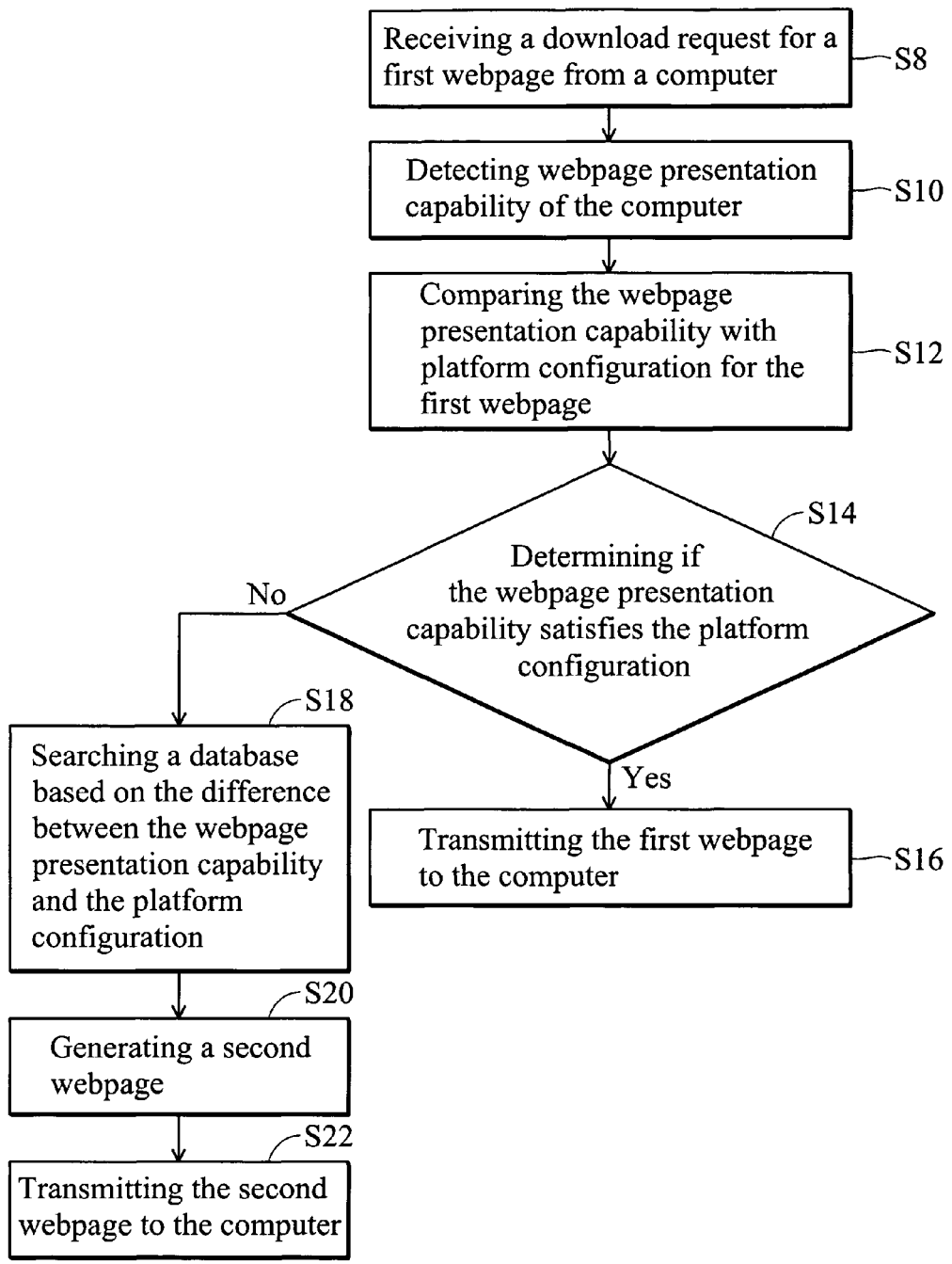
FIG. 4 is a flowchart of an exemplary embodiment of a method for managing fault-tolerant webpage presentation.

With reference to FIG. 4, when receiving a download request for first webpage 21 from computer C0 (step S8), detector 60 retrieves the address of computer C0, and detects webpage presentation capability thereof (step S10) comprising at least device type (such as a personal computer or a PDA), display resolution, display color level, browser type, version, language, plug-ins, or cookies. The detection for webpage presentation capabilities may be implemented by negotiation therebetween via message exchange. Troubleshooter 70 compares webpage presentation capability of computer C0 with platform configuration 51 for first webpage 21 (step S12), and thus determines if webpage presentation capability of computer C0 satisfies platform configuration 51 (step S14). When the detected webpage presentation capability of computer C0 matches platform configuration 51 for first webpage 21, server 100 transmits first webpage 21 to computer C0 (step S16). When the webpage presentation capability of computer C0 and the platform configuration 51 for first webpage 21 have difference therebetween, troubleshooter 70 searches database 80 based on the difference (step SI 8) to provide second webpage 22 (step S20). Server 100 transmits second webpage 22 to computer C0 (step S22).

Server 100 may store different webpage versions for different recipient devices, wherein correspondence between the devices and the webpage versions may be stored in database 80. For example, first webpage 21 is composed in hypertext markup language (HTML), and second webpage 22 is composed in wireless markup language (WML). Platform configuration 51 comprises predetermined device types suitable for first webpage 21. First webpage 21 is suitable for personal computers, and second webpage 22 is suitable for PDA and mobile phones. In step S10, device detector 65 determines the device type of computer C0 (such as a PDA). When the device type of computer C0 is different from the predetermined device type, troubleshooter 70 searches webpage data 20 for a suitable webpage and transmits the suitable webpage (such as second webpage 22) to computer C0. Second webpage 22 and first webpage 21 may comprise an identical portion of content.

In step S10, resolution detector 61 detects the display resolution of computer C0. For example, the display resolution of computer C0 detected by resolution detector 61 is 1024*768 pixels. Platform configuration 51 comprises a predetermined resolution, 800*600 pixels. That is, first webpage 21 is preferably shown by a display of a client computer the resolution of which is configured to 800*600 pixels. When the resolution of computer C0 (1024*768 pixels) is different from the predetermined resolution (800*600 pixels), resolution adjuster 71 inserts the predetermined resolution for first webpage 21 from database 80 to second webpage 22. After having been transmitted to computer C0, second webpage 22 comprising information of the predetermined resolution (800*600 pixels) is displayed by computer C0. Accordingly, the display of computer C0 may be adjusted to the predetermined resolution (800*600 pixels) by a user.

Alternatively, when the display resolution of computer C0 is different from the predetermined resolution, resolution adjuster 71 locates resolution adjustment program 81 from database 80 and embeds resolution adjustment program 81 to second webpage 22. After second webpage 22 has been transmitted to computer C0, resolution adjustment program 81 automatically adjusts the display (not shown) of computer C0 to the predetermined resolution. Resolution adjustment program 81 may receive a user confirmation from an input device of computer C0 to begin adjusting resolution.

In step S10, color detector 62 detects the display color level of computer CO (such as 16 million colors). Platform configuration 51 comprises predetermined color level (such as 24 million colors). When the display color level of computer C0 is different from the predetermined color level, color level adjuster 72 locates the predetermined color level (such as 24 million colors) for first webpage 21 from database 80 and inserts the predetermined color level to second webpage 22. When transmitted to computer C0, second webpage 22 comprising information of the predetermined color level is displayed by computer C0. Accordingly, the display of computer C0 may be adjusted to the predetermined color level upon user operations.

Alternatively, when the color level of computer C0 is different from the predetermined color level, color level adjuster 72 locates color level adjustment program 82 from database 80 and embeds color level adjustment program 82 to second webpage 22. When second webpage 22 has been transmitted to computer C0, color level adjustment program 82 automatically adjusts the display (not shown) of computer C0 to the predetermined color level. Color level adjustment program 82 may receive a user confirmation from an input device (not shown) of computer C0 to begin color level adjustment.

In step S10, plug-in detector 63 detects the plug-ins of a web browser of computer C0. Platform configuration 51 comprises predetermined plug-ins for first webpage 21. When web browser 30 lacks predetermined plug-in 85 in FIG. 2 (such as a small program which can be directly installed on a client computer), plug-in guide 73 locates installation program 83 from database 80 and inserts installation program 83 to second webpage 22. In computer C0, installation program 83 automatically adds predetermined plug-in 85 to web browser 30.

If the predetermined plug-ins are not shareware, or based on other factors, plug-in guide 73 locates hyperlinks to the predetermined plug-ins from database 80 and inserts the hyperlinks in second webpage 22.

In step S10, web browser detector 64 detects the settings of web browser 30 of computer C0, comprising at least the type, version, language, or cookies of the web browser. Database 80 may comprise correspondence between webpages and languages used by web browsers. For example, the content of first webpage 21 is written in English, and the content of second webpage 22 is written in Chinese. When web browser 30 utilizes Chinese, troubleshooter 70 may search Chinese data corresponding to first webpage 21 to provide second webpage 22, or directly locate a corresponding webpage written in Chinese.

Some webpage presentation capabilities may involve system configuration of client computers (such as operating system configuration), which can be modified only through operating system interfaces. On-line director 74 provides a customized online help webpage for reference and system configuration modification by client users. Platform configuration 51 may comprise system configuration corresponding to first webpage 21, and database 80 may store directions to the system configuration. Thus, in step S10, system configuration detector 66 may detect the system configuration of computer C0. When the system configuration of computer C0 does not match the predetermined system configuration for first webpage 21, On-line director 74 locates directions 86 for the predetermined system configuration from database 80 and inserts directions 86 in the second webpage 22, as an online help webpage to be transmitted to computer C0.

Thus, the system for managing fault-tolerant webpage presentation stores configuration of the platform for displaying webpages and detects webpage presentation capabilities comprising device type of a recipient computer, display resolution, color level, and the type, version, language, plug-ins, and cookies of the web browser. The system compares the webpage presentation capabilities and the configuration of the platform and performs a search based on the difference therebetween to provide solutions. Note that the solutions together with the demanded webpage can be transmitted to the recipient computer when required.

In conclusion, a system for managing fault-tolerant webpage presentation is implemented in a system where web browsers are utilized as user interfaces. System configuration is adjusted based on respective recipient computers for better webpage browsing and ameliorating the problems (such as color distortion or confused layout). Further, the system for managing fault-tolerant webpage presentation provides an appropriate webpage browsing platform based on client operating system configuration via resolution adjustment and provides online help for users to address problems.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for managing fault-tolerant webpage presentation, comprising:

storing a configuration of a platform for displaying a first webpage of a web server, wherein the configuration of the platform comprises a predetermined resolution and a predetermined color level;

when receiving a request from a client computer for downloading the first webpage, detecting a display resolution and a display color level of the client computer;

comparing the display resolution with the predetermined resolution and the display color level with the predetermined color level;

when the display resolution and the predetermined resolution have a first difference therebetween, performing a search based on the first difference to provide a second webpage, and when the display color leval and the predetermined color level have a second difference therebetween, performing a search based on the second difference to provide the second webpage, and embedding an adjustment program into the second webpage transmitting the second webpage to the client computer;

automatically adjusting, by the adjustment program, the display resolution of the client computer to the predetermined resolution after the second webpage has been transmitted to the client computer, in response to a determination of the display resolution and the predetermined resolution having the first difference; and automatically adjusting, by the adjustment program, the display color level of the client computer to the predetermined color level after the second webpage has been transmitted to the client computer, in response to a determination of the display color level and the predetermined color resolution having the second difference.

2. The method as claimed in claim 1, wherein, when the display resolution matches the predetermined resolution and the display color level matches the predetermined color level, transmitting the first webpage to the client computer.

3. The method as claimed in claim 1, wherein the configuration of the platform further comprises a predetermined plug-in for the first webpage, the method further comprising, when a web browser on the client computer delivering the request lacks the predetermined plug-in, embedding an installation program into the second webpage, wherein the installation program automatically installs the predetermined plug-in to the web browser.

4. A system for managing fault-tolerant webpage presentation comprising:

a server;

a processor;

a database storing a configuration of a platform for displaying a first webpage of a web server, wherein the configuration of the platform comprises a predetermined resolution and a predetermined color level;

a detector, when receiving a request from a client computer for downloading the first webpage, detecting a display resolution and a display color level of the client computer; and a troubleshooter comparing the display resolution with the predetermined resolution and the display color level with the predetermined color level, when the display resolution conforms to the predetermined resolution and the display color level conforms to the predetermined color level, transmitting the first webpage to the client computer, when the display resolution and the predetermined resolution have a first difference therebetween, performing a search based on the first difference to provide a second webpage, and when the display color level and the predetermined color level have a second difference therebetween, performing a search based on the second difference to provide the second webpage, embedding an adjustment program into the second webpage, and transmitting the second webpage to the client computer, wherein after the second webpage has been transmitted to the client computer, the adjustment program automatically adjusts the display resolution of the client computer to the predetermined resolution, in response to the determination of the display resolution and the predetermined resolution having a first difference and the display color level of the client computer to the predetermined color level, in response to the determination of the display color level and the predetermined color resolution having the second difference.

5. The system as claimed in claim 4, wherein the configuration of the platform further comprises a predetermined plug-in for the first webpage, when a web browser on the client computer delivering the request lacks the predetermined plug-in, the troubleshooter embeds an installation program into the second webpage, wherein the installation program automatically installs the predetermined plug-in to the web browser.

* * * * *